United States Patent
Spurlin

Patent Number: 5,518,108
Date of Patent: May 21, 1996

[54] RADIAL AIR GAP ELECTROMAGNETIC OSCILLATOR FOR TWO MASS VIBRATION SYSTEM

[76] Inventor: William V. Spurlin, 202 Locust St., Indiana, Pa. 15701

[21] Appl. No.: 367,893

[22] Filed: Jan. 3, 1995

[51] Int. Cl.⁶ ................................................ B65G 27/24
[52] U.S. Cl. ................................... 198/769; 310/36
[58] Field of Search ........................ 198/757, 767, 198/769; 310/36, 39; 318/114, 119, 126, 129

[56] References Cited

U.S. PATENT DOCUMENTS

| | | |
|---|---|---|
| 2,464,216 | 3/1949 | Devol . |
| 2,492,249 | 12/1949 | Willard . |
| 2,654,466 | 10/1953 | Spurlin . |
| 2,696,292 | 12/1954 | Spurlin . |
| 2,760,504 | 8/1956 | Spurlin . |
| 2,895,064 | 7/1959 | Hoff . |
| 2,997,158 | 8/1961 | Moskowitz . |
| 3,258,111 | 6/1966 | Spurlin et al. ......................... 198/769 |
| 3,644,763 | 2/1972 | Skrobisch .............................. 310/36 |
| 4,909,379 | 3/1990 | Albeck et al. ....................... 198/769 |
| 5,126,605 | 6/1992 | Palmero ................................ 310/36 |

*Primary Examiner*—Joseph E. Valenza
*Attorney, Agent, or Firm*—Randy W. Lacasse

[57] ABSTRACT

A vibratory device operable as a two mass vibrating system comprising a base mass and a work member mass spring coupled and mounted on isolator springs and operating at a frequency approximating the natural frequency of the system. A multiple number of leaf springs inclined at an angle to the base and work member mounting plate provide a combination of torsional and vertical amplitude required to cause the conveying action of the work member. The exciter for the vibratory device is an AC powered multiple electromagnetic oscillator having a fixed redial air gap eliminating the possibility of self destruction by impact of the poles faces without limiting the amplitude of the vibratory device.

11 Claims, 3 Drawing Sheets

RADIAL AIR GAP ELECTROMAGNETIC OSCILLATOR FOR TWO MASS VIBRATION SYSTEM

BACKGROUND OF THE INVENTION

1. Field of Invention

A vibratory device operable as a two mass vibratory system moving bulk material or discrete parts in a circular and inclined path of conveying. The work member for the vibratory device can be a parts handling bowl which conveys and orients parts in a predetermined position for delivery.

The work member could also be a circular screen with one or more decks for sizing bulk material, or could be designed for any application requiring a circular conveying action.

2. Discussion of Prior Art

Vibratory devices operating as two mass vibrating systems are well known in the prior art and in commercial uses for material and parts handling equipment, and generally comprise an electromagnet.

Typically the electromagnet used for generating the exciting force consists of a coil wound on a laminated core with an air gap between the core and the laminated armature. The electric power supply is either AC or AC rectified current.

Other two mass vibrating systems, used for conveying material in a straight line, use an electromagnet coil on a laminated core but have a permanent magnet armature spaced from the core to establish an air gap. The electric power supply is AC current and the permanent magnet has the same operating result as a rectified power supply.

SUMMARY OF THE INVENTION

The present invention is a vibratory device for driving a work member for handling discrete parts and screening or elevating bulk material operable as a two mass vibrating system. The device comprises a laminated core with multiple electromagnetic poles as part of the base mass and an armature consisting of multiple permanent magnetic poles which match the number of electromagnetic poles in the core, and is part of the work member mass.

One end of a armature is fixed to the work member mounting plate and the opposite end is inserted through an elastomer bushing in the base mass which permits torsional and vertical amplitude between the two masses while maintaining alignment of the armature within the electromagnetic core.

The electromagnetic poles alternately change polarity with AC power supply causing an attraction-repulsion of the permanent magnet armature thereby providing the oscillating exciting force to the two mass vibratory system.

The object of this invention is to provide a fixed radial air gap between the core and the armature which eliminates possible striking of the electromagnet pole faces regardless of the amplitude of the two masses.

Other objects of this invention are as follows:

Eliminate the very precise adjustment of the air gap, needed for each feeder application, as required in the prior art.

Provide space to maximize the number of inclined leaf spring mounting faces producing a more uniform conveying action around the circumference of the work member. More spring mounting surfaces minimizes stress concentrations at spring clamping surfaces as opposed to multiple springs at each mounting surface, as shown in the prior art.

The elastomer bushing provides additional damping to the vibratory spring system of the present invention, which may require higher input power, and thereby minimizes change in conveying speed due to material load in the work member.

The conveying speed is determined by the amplitude of the work member and is set by varying the frequency, voltage, or a combination of both, with the AC power supply controller.

The above and other objects of the invention will become apparent upon consideration of the details for preferred embodiments of the invention given in connection with the following drawings.

DESCRIPTION OF THE PREFERRED EMBODIMENTS

Figure 1:
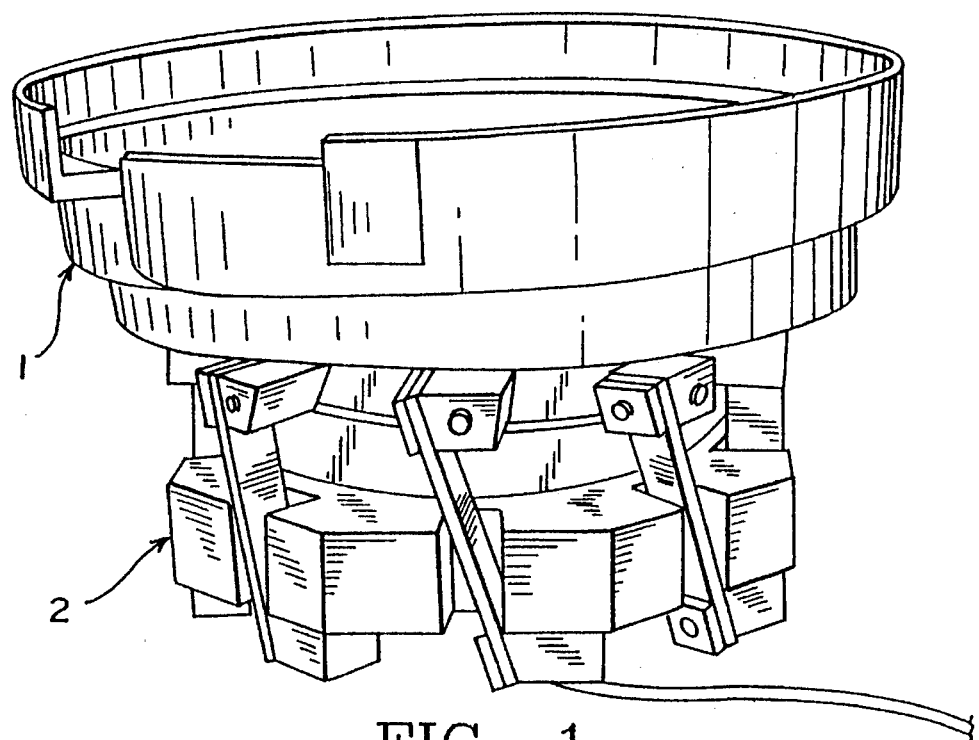
FIG. 1 is a perspective view of the Vibratory Drive with attached parts feeder bowl.

FIG. 1, shows a parts handling bowl 1 secured to a vibrating drive part 2, and represents any work member requiring a circular conveying action.

Figure 2:
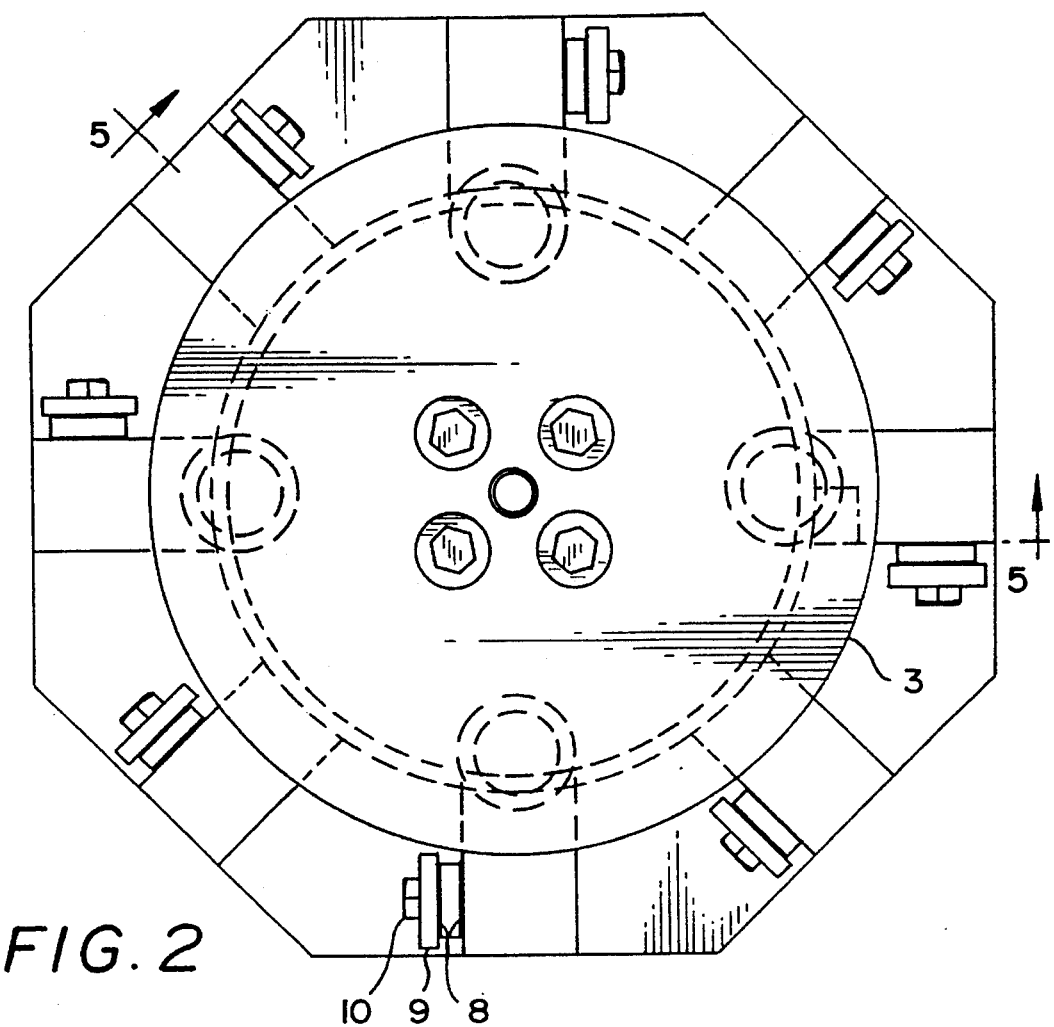
FIG. 2 is a plane view of the Vibratory Drive.
Figure 3:
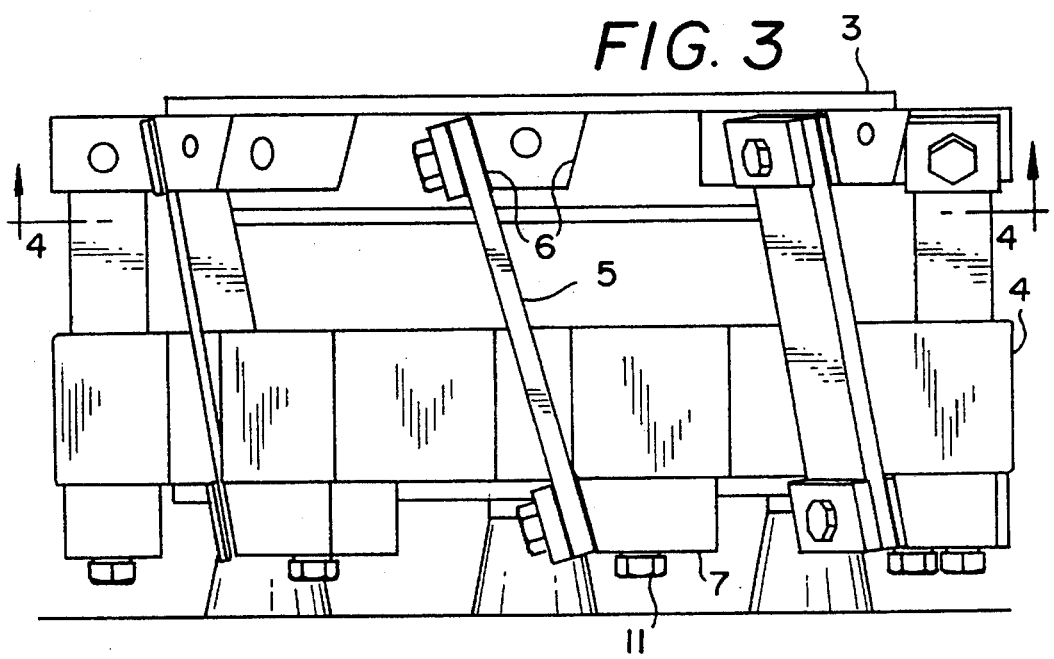
FIG. 3 is an elevation of the Vibratory Drive.

FIG. 2 and FIG. 3 show details of a vibratory drive consisting of a mounting plate 3 and base 4 connected by leaf springs 5. Mounting plate 3 has angular spring mounting surfaces 6. The base 4 is provided with movable spring mounting blocks 7. Leaf springs 5 are mounted with spacers 8 and clamp plates 9 all secured by bolts 10. The leaf spring 5 mounting angle is that which will provide the necessary conveying action of the work member 1 shown in FIG. 1.

The direction of conveying, as shown in FIGS. 2 and 3, is counter-clockwise. Reversing the angle of leaf springs on clamping surfaces 6 and relocating spring mounting blocks 7 on base 4 in the opposite direction by repositioning clamping bolt 11 will change the direction of conveying to clockwise.

There are eight leaf springs 5, as shown in FIG. 2 and FIG. 3, however this number can change with the size of the vibratory drive required, for example, increasing the number for larger units and a decreasing the number for smaller sizes.

The radial design of the oscillator allows the springs to be uniformly distributed around the base to balance the unit. The design as shown in FIG. 1 allows for the attachment of many leaf springs 5 at many positions. A greater number of leaf springs distributed around the base 4 at a greater number of positions will help in reducing stress.

Figure 4:
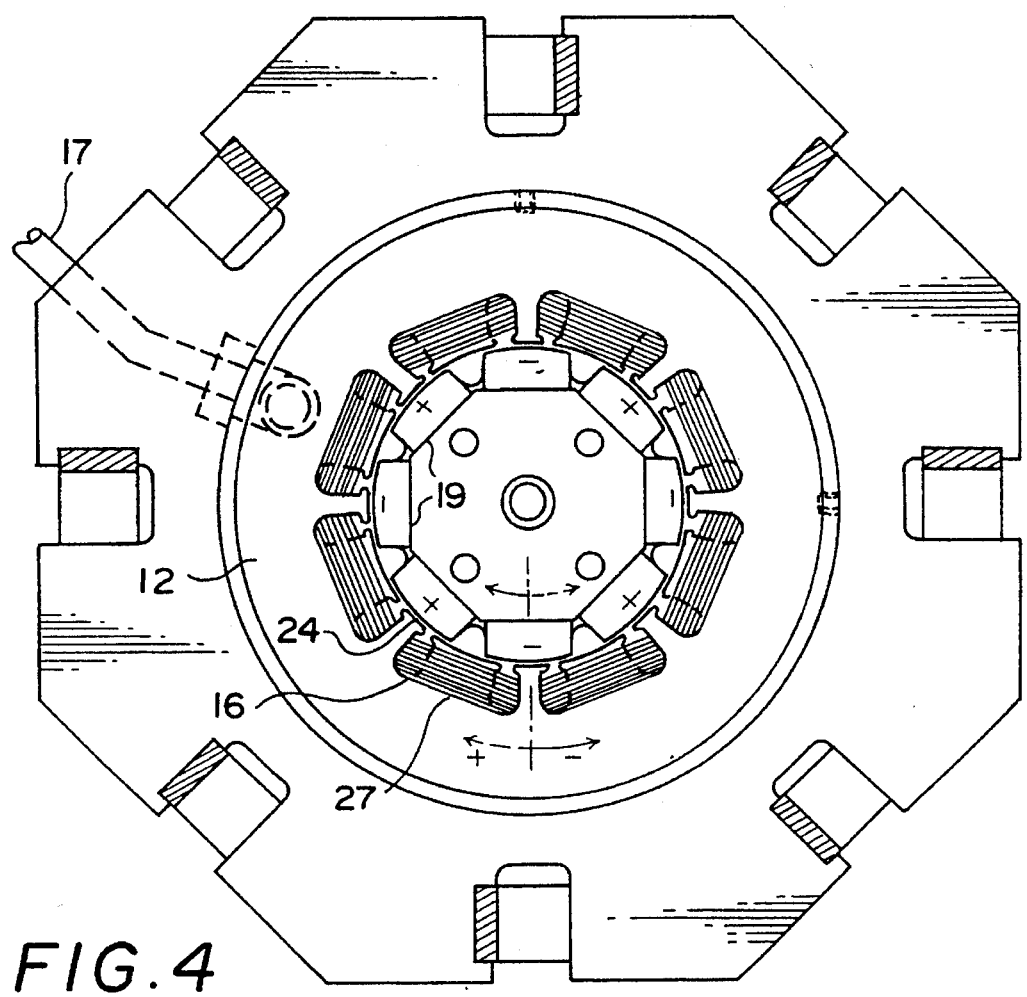
FIG. 4 is a cross-sectional view taken at line 4—4 of FIG. 3.
Figure 5:
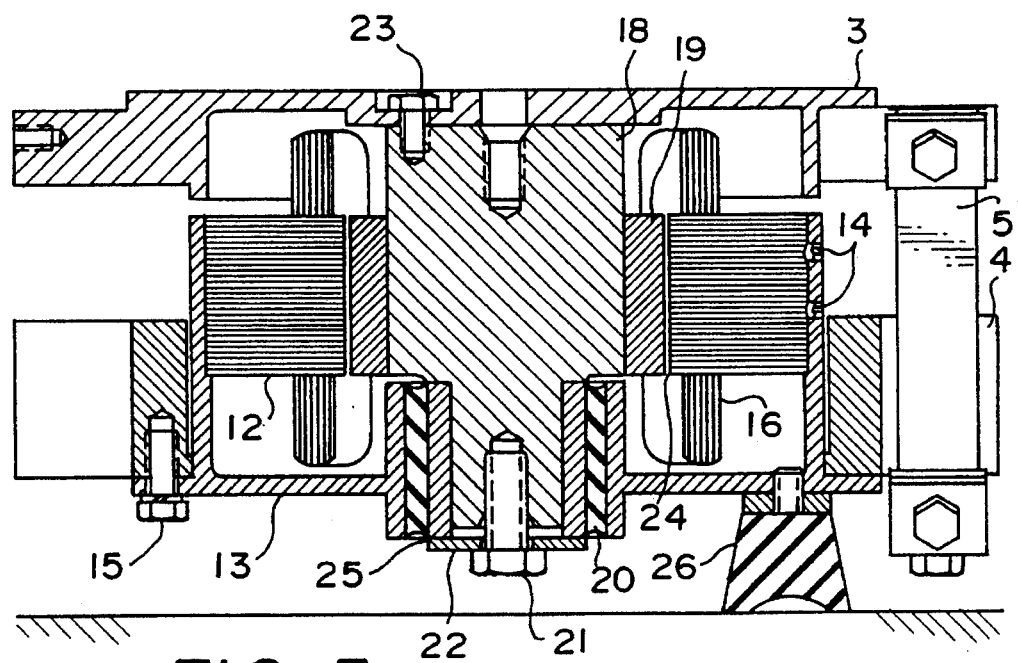
FIG. 5 is a cross-sectional view taken at line 5—5 of FIG. 2.

FIG. 5 shows a cross-section at line 5—5 on FIG. 2 and shows the electromagnetic laminated core 12 located in housing 13 and locked in place with set screws 14 and housing 13 centers in base 4 and secured by bolts 15. Electromagnetic coils 16 are wound on laminated core poles 27 and are connected to an AC power source by cable 17, as shown in FIG. 4.

FIG. 4 and FIG. 5 show a steel armature 18 with bonded permanent magnets 19 positioned with alternate positive and negative poles. The armature 18 is centered in the elastomer bushing 20 and secured by clamping with bolt 21 and bellville washer 22. The opposite end of armature 18 is attached to the mounting plate 3 with bolts 23. The assembly of these parts centers armature 18 within electromagnetic core 12 and defines the radial air gap 24.

The radial air gap 24 is fixed at the time manufacturing or designing and is a property of the elements used. No adjustment means are provided or are necessary as the gap will not vary with load.

The elastomer bushing 20 shown in FIG. 5 consists of a steel inner sleeve 25 bonded to elastomer 20 and is pressed into and bonded to housing 13 to achieve a reloaded fit. The elastomer has a high stiffness in compression to maintain the radial air gap 24 but will deflect in a shear and torsion direction of movement described by leaf springs 5 and contributes to the total spring stiffness required by the two mass vibrating system. Also the high internal damping of the elastomer 20 requires additional power input and this feature prevents excessive change in amplitude of the work member due to the load effect of material or parts being conveyed. The preferred elastomer bushing is commercially available as a "center bonded bushing without outer member" and has a radial spring rate equal to 168,000 lbs/in and a torsional spring rate equal to 81 lbs-in/deg. Other bushings with other compression values may be used. The bushing may be bonded or attached to the housing 13 with an epoxy resin, adhesive or other known bonding materials or methods.

FIG. 4 shows how the, exciter force is generated by electromagnetic coils 16 on laminated core poles 27. Each half wave of AC power pulses changes polarity of poles from positive to negative which attract and repulse the fixed polarity permanent magnets 19. This equal and opposite magnetic force provides the oscillating exciting force required to produce the amplitude necessary for the conveying action of the work member.

FIG. 5 shows elastomer vibration isolators 26 are used to support and isolate the complete vibratory parts feeder from the supporting structure shown in FIG. 1.

Figure 6:
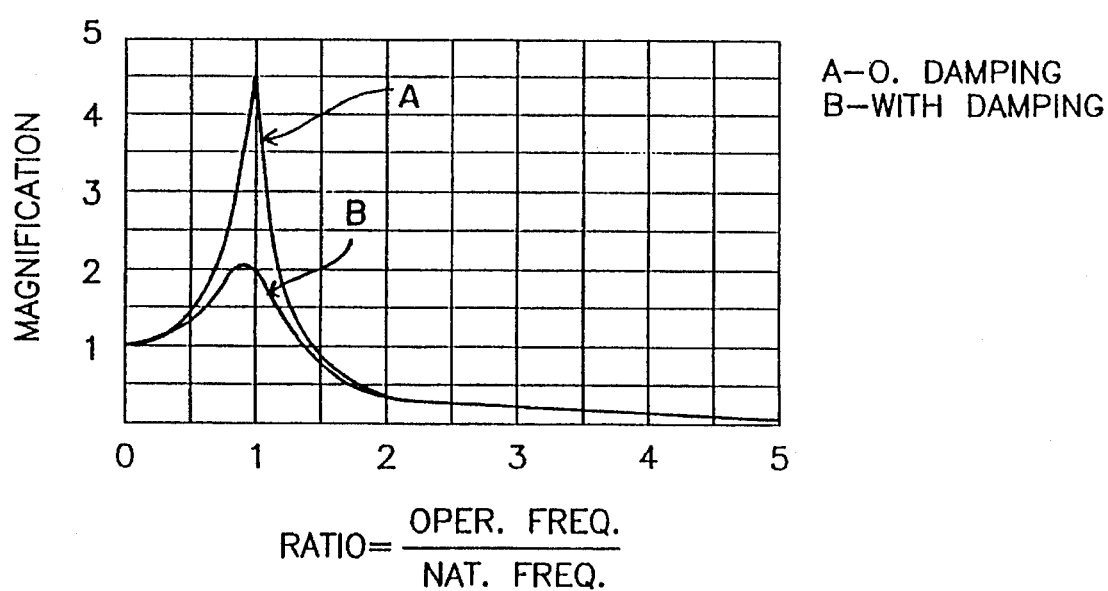
FIG. 6 is a magnifying factor versus frequency ratio curve.

FIG. 6 shows the positive effect of damping provided by the leaf springs 5 and elastomer bushing 20 as described above.

CONCLUSION

A system and method has been shown in the above embodiments for maintaining a radial air gap in an electromagnetic oscillator for two mass vibration systems. While various preferred embodiments have been shown and described, it will be understood that there is no intent to limit the invention by such disclosure, but rather, is intended to cover all modifications and alternate constructions falling within the spirit and scope of the invention as defined in the appended claims.

I claim:

1. A two mass vibratory conveying device having a natural frequency near the AC power supply frequency comprising:

a base mass;

a work member mass;

an oscillator comprising: a centralized armature having multiple poles and a magnetic core having multiple poles;

said magnetic core substantially encapsulating said armature and said oscillator provided with an exciting force from said AC power supply creating a vibratory motion while retaining a fixed radial air gap between said armature and said magnetic core, and wherein said fixed radial gap is established by attaching an upper end of said armature to the work member mass, inserting a lower end of said armature through an elastomer bushing located in said base mass and attaching said lower end of said armature to said base mass.

2. A two mass vibratory conveying device as per claim 1, wherein said armature poles comprise an even number of permanent magnets spaced equally around the circumference of said armature with alternating positive and negative poles and wherein said magnetic core poles comprise a matching number of electromagnetic poles, with each pole wound with a wire coil and all coils connected to said AC power supply which changes polarity from positive to negative on each half cycle of said AC power supply.

3. A two mass vibratory conveying device as per claim 1, wherein said device further comprises a spring system comprised of multiple leaf springs distributed uniformly around the circumference of a mounting plate attached to said work member mass and said base mass, with each of said springs inclined from the vertical at an angle to produce a conveying action to move parts or materials.

4. A two mass vibratory conveying device, as per claim 1, wherein said elastomer bushing adds damping to the two mass vibrating system minimizing effect on said conveying action due to material load changes in said work member mass.

5. A two mass vibratory conveying device, as per claim 1, wherein said elastomer bushing has a very high radial stiffness compression value and a lessor torsional compressional value to hold said fixed air gap between said armature and core.

6. A two mass vibratory conveying device, as per claim 1, wherein said elastomer bushing has a very high stiffness compression value to contribute to total leaf spring stiffness in the shear direction and a lessor compression value to contribute to total leaf spring stiffness in the torsional direction.

7. A two mass vibratory conveying device, as per claim 1, wherein no adjustments are necessary to maintain said fixed air gap between said armature and said magnetic core of said oscillator.

8. A two mass vibratory conveying device as per claim 1, wherein said armature is engaged in a rotational direction within said elastomer bushing.

9. A two mass vibratory conveying device having a natural frequency near the AC power supply frequency comprising:

a base mass;

a work member mass;

an oscillator comprising a centralized armature having multiple magnetic poles, and a magnetic core having multiple electromagnetic poles;

wherein, said magnetic poles are spaced equally around the circumference of said armature with alternating positive and negative poles and wherein a matching number of electromagnetic poles are formed in said electromagnetic core with each pole wound with a wire coil and all coils connected to said AC power supply which changes polarity from positive to negative on each half cycle of said AC power supply;

a radial air gap is established between said armature and said magnetic core by attaching an upper end of said armature to the work member mass, inserting a lower end of said armature through a bushing located in said base mass and attaching said lower end of said armature to said base mass, and wherein said bushing has a very high radial stiffness compression value and a lessor torsional compressional value to hold said fixed air gap between said armature and core.

10. A two mass vibratory conveying device as per claim 9, wherein said device further comprises a spring system comprised of multiple leaf springs distributed uniformly around the circumference of a mounting plate attached to said work member mass and said base mass, with each of said springs inclined from the vertical at an angle to produce a conveying action for moving parts or materials.

11. A two mass vibratory conveying device having a natural frequency near the AC power supply frequency comprising:

a base mass;

a work member mass;

an oscillator comprising:a centralized armature having multiple poles and a magnetic core having multiple poles, and said magnetic core substantially encapsulating said armature and said oscillator provided with an exciting force from said AC power supply creating a vibratory motion while retaining a fixed radial air gap between said armature and said magnetic core;

said fixed radial air gap established by attaching an upper end of said armature to the work member mass, inserting a lower end of said armature through a bushing located in said base mass and attaching said lower end of said armature to said base mass, and wherein said bushing has a very high radial stiffness compression value and a lessor torsional compressional value to hold said fixed air gap between said armature and core.

* * * * *

UNITED STATES PATENT AND TRADEMARK OFFICE
CERTIFICATE OF CORRECTION

PATENT NO. : 5,518,108
DATED : May 21, 1996
INVENTOR(S) : William V. Spurlin

It is certified that error appears in the above-indentified patent and that said Letters Patent is hereby corrected as shown below:

COLUMN 3

Line 17, "reloaded" should read --preloaded--.

Signed and Sealed this

Twenty-sixth Day of November 1996

Attest:

BRUCE LEHMAN

*Attesting Officer*     *Commissioner of Patents and Trademarks*